Dec. 7, 1965   W. H. SIMMONS   3,222,093
FASTENING APPARATUS
Filed April 11, 1963
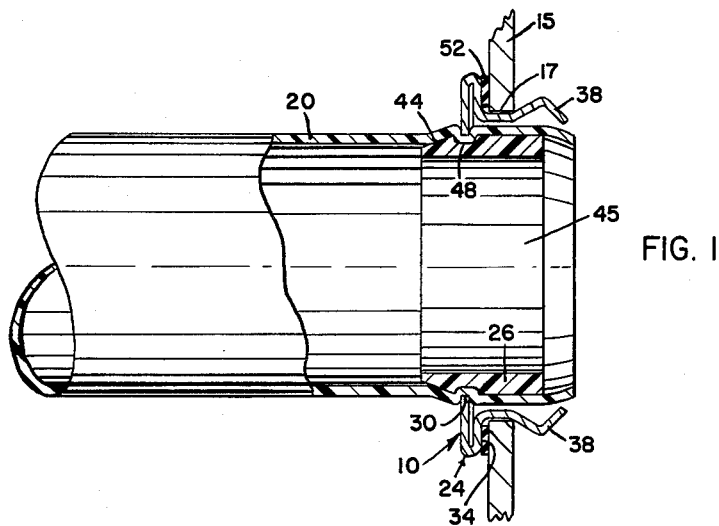
FIG. 1
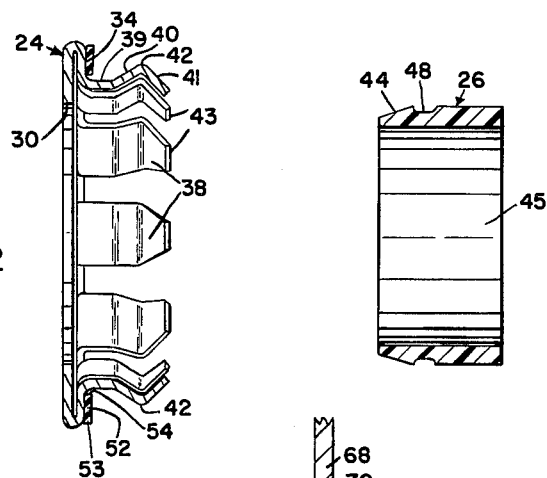
FIG. 2                    FIG. 3
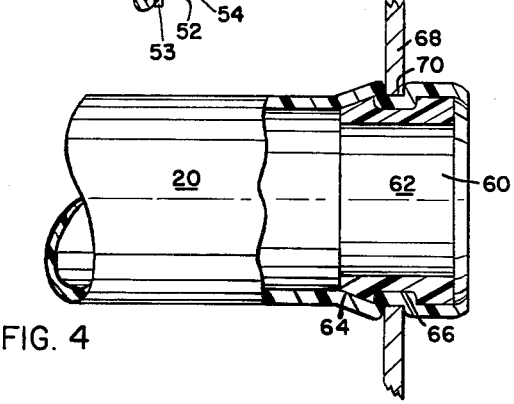
FIG. 4
INVENTOR.
WALTER H. SIMMONS.
BY
*Frederick E. McMullen*
ATTORNEY.

United States Patent Office 3,222,093
Patented Dec. 7, 1965

3,222,093
FASTENING APPARATUS
Walter H. Simmons, Mattydale, N.Y., assignor to Carrier Corporation, Syracuse, N.Y., a corporation of Delaware
Filed Apr. 11, 1963, Ser. No. 272,401
1 Claim. (Cl. 285—162)

This invention relates to a method and apparatus for fastening, and more particularly to a method and apparatus for fastening a conduit to a member.

It is frequently necessary to fixedly position a conduit relative to a member through which the conduit passes as for example in electrical applications where the conduit serves as an enclosure for one or more electric conductors and the member through which the conduit passes comprises the wall of an electric junction box. In electrical applications, apparatus for fixedly positioning the conduit relative to the junction box may comprise a first element having an opening therein for receiving the conduit with a threaded part adapted to be inserted through the junction box wall opening and a cooperating second element positionable within the junction box having an opening therein for receiving the conduit with a threaded part engageable with the first element threaded part to securely fasten the first and second elements to the junction box wall. A clamping assembly is provided on one or the other of the first and second elements having a pair of adjustable clamping elements adapted to grip the conduit therebetween. In applications other than electrical where it is desired to fixedly position a conduit relative to a member through which the conduit passes, similar attaching apparatus may be utilized.

Conduit fastening apparatus of the type described heretofore is relatively expensive since each of the several parts, normally metal, are required to be separately fabricated. Further, the conduit clamping means of the heretofore described apparatus tends to collapse the conduit which in electrical applications may crush the conductors therein leading to a possible short circuit. Where the use of deformable or pliable conduits is contemplated, which have little or no resistance to radial compression, use of fastening apparatus of the type heretofore described is avoided.

In certain applications where a conduit passes through a member, for example the wall of the aforementioned electric junction box, it may be advantageous to provide a weather seal to prevent the ingress of atmospheric elements between the conduit and the wall opening into the junction box. Fastening apparatus of the type heretofore described normally does not provide an effective weather seal. As a consequence separate sealing means between the fastening apparatus and the conduit and the junction box wall opening is required.

With the above desiderata in mind, it is a primary object of this invention to provide an improved fastening apparatus for and a method of attaching a conduit to a member which obviates the disadvantages of prior art constructions.

It is an additional object of this invention to provide a relatively inexpensive fastening apparatus to effectively attach deformable conduits to a member without deleterious crushing of the conduit.

It is a further object of this invention to provide a fastening apparatus having a minimum number of parts adapted to tightly secure a conduit to a surrounding member.

It is an additional object of this invention to provide unique fastening apparatus having simplified construction operable to releasably lock a conduit to a member through which the conduit passes. Other advantages may be appreciated upon reading of the following disclosure.

This invention relates to apparatus for releasably fastening a tubular element formed of relatively deformable resilient material to a structural member having an opening therein through which the tubular element passes which includes an expander positionable within the tubular element to expand a selected part of the tubular element radially outwardly, the expander having a recess in the outer surface thereof and means adjacent one end thereof to facilitate insertion of the expander in the tubular element and the expander-tubular element assembly in the structural member opening.

This invention relates to apparatus for releasably fastening a tubular element such as a conduit to a wall member having an opening therein through which the tubular element passes comprising in combination a first member insertable in the tubular element having means operable to expand a part of the tubular element radially outwardly, the first member expanding means having a recess, and a second member with an opening therein for receiving the tubular element therethrough having locking means adapted to cooperate with the first member recess to tightly grip the tubular element therebetween, the second member having expansible means adapted upon insertion in the wall opening to tightly engage the wall uniting the conduit therewith.

This invention further relates to a method of connecting a flexible tubular element with the wall of an enclosure having an opening through which the flexible tubular element projects to the interior of the enclosure, the steps of which consist in inserting a first member having a locking recess in the outer surface thereof and an outer dimension slightly in excess of the inner diameter of the tubular element into the tubular element to radially expand a selected part of the tubular element, forcibly sliding over the outer surface of the tubular element a second member having a plurality of resilient fingers capable of radial inward movement upon passage through the wall opening and subsequent outward movement when free of engagement of the portion of the wall defining the opening, to a position where the second member releasably engages the recess on the first member through the tubular element, and inserting the second member resilient fingers through the wall opening to securely connect the assembly to the wall member.

This invention further relates to apparatus for releasably fastening a deformable tubular element such as a conduit to a wall having an opening therein through which the tubular element is adapted to pass comprising a member insertable in the tubular element having means operable to expand a part of the tubular element radially outwardly, the tubular element expanded part tightly engaging the wall upon insertion of the tubular element through the wall opening, a recess in the member expanding means for snugly receiving the portion of the wall defining the opening to securely fasten the assembly to the wall, the member having means to facilitate insertion of the member in the tubular element.

Referring to the accompanying drawing,

FIGURE 1 is a view partly in section of applicant's novel fastening apparatus illustrating the parts in fully assembled relationship, FIGURE 2 is a cross-sectional view of applicant's novel fastening apparatus connector part, FIGURE 3 is a cross-sectional view of applicant's expansion part; and FIGURE 4 is a view partly in section of a modified embodiment of applicant's novel fastening apparatus illustrating the parts in fully assembled relationship.

Referring to the drawing, a wall member 15 having an opening 17 therein through which a tubular element 20 such as a conduit is adapted to pass is shown. Fastening apparatus of the present invention, designated generally by the numeral 10, is provided to releasably secure the tubular element 20 to the wall member 15. Wall member 15 may, for example, comprise the wall of a housing such as an electric junction box or a duct. Tubular element 20 is formed from a suitable resilient or deformable material. In the preferred embodiment of the invention, tubular element 20 is formed from a suitable plasic material. A suitable commercial plastic material is "Templex," made by Minnesota Mining and Manufacturing Company. Other resilient or deformable materials, for example, rubber or metal, may be employed. Where tubular element 20 is used in electrical applications, one or more suitable electrical conductors (not shown) are positioned therewithin.

Fastening apparatus 10 comprises cooperating connector 24 and expander or support member 26. Connector 24 is generally round with an axial bore 30 for receiving the tubular element 20 therethrough. Connector 24 is preferably metal suitably formed as by a stamping operation. Other relatively rigid non-metallic materials may be used. The diameter of the connector bore 30 is preferably equal to or slightly less than the outer diameter of tubular element 20.

Connector 24 includes a substantially radial locating or stop surface 34 terminating in a plurality of generally axially extending resilient tongue members 38. A part 39 of each tongue member 38 adjacent stop surface 34 is disposed about the circumference of a circle having a diameter preferably equal to or slightly greater than the diameter of wall opening 17. Each of the tongue members 38 is formed with a radially outwardly extending part 40 and a radially inwardly extending part 41. The outermost portion 42 of each of the radially outwardly extending tongue member parts 40 is disposed about the circumference of a circle having a diameter greater than the diameter of wall opening 17. The innermost portion 43 of each of the radially inwardly extending tongue member parts 41 is disposed about the circumference of a circle having a diameter less than the diameter of wall member opening 17. By this latter construction, location and insertion of the connector 24 into the wall opening 17 is facilitated.

The fastening apparatus expander 26 is generally cylindrical having an outer diameter preferably slightly in excess of the inner diameter of tubular element 20. The expander 26 may be formed from any suitable rigid material which in a preferred embodiment of the invention is a suitable plastic. Other suitable rigid materials such as metal may be employed. The expander 26 is provided with an axial bore 45. One end of expander 26 is preferably bevelled at 44 to facilitate the insertion of the expander 26 in the tubular element 20. The outer surface of expander 26 is provided with a locking groove or recess 48. Recess 48 is preferably adjacent the bevelled surface 44 and is adapted to cooperate in a manner to be more particularly explained hereinafter with the connector 24 to securely attach the fastening apparatus connector and expander 24, 26 respectively to the tubular element 20.

To use applicant's novel fastening apparatus, expander 26 is inserted into the tubular element 20 to the position desired. Where the tubular element 20 encloses one or more electrical conductors (not shown), it is appreciated that these conductors pass through the bore 45 of the expander. Insertion of the expander 26 radially stretches or expands the tubular element 20 since the outer diameter of expander 26 is slightly greater than the inner diameter of the tubular element. Stretching of the tubular element 20 is facilitated by the resilient or deformable characteristics of the element. As a result, the inner surface of the tubular element 20 tightly engages the outer surface of the expander 26.

Expander 26 is positioned with the tubular element 20 to a depth sufficient so that when the connector 24 is assembled therewith, in a manner to be later described, the outer ends 43 of tongues 38 will terminate short of the end of the tubular member as shown in FIGURE 1.

The tubular element having a portion thereof deformed by the expander 26 therewithin may then be moved relative to bore 30 of connector 24. The tubular element-expander assembly and connector 24 are moved relative to one another until the peripheral surface of the connector bore 30 engages or snaps into recess 48 of expander 26 to tightly fix the fastening apparatus 10 relative to the tubular element 20.

The tubular element 20 having the fastening apparatus 10 fixedly attached thereto, is thereafter inserted through opening 17 in wall member 15 until connector stop surface 34 abuts wall member 15. The radially inwardly extending part 41 of tongue members 38 facilitates the location and initial entry of the connector 24 into wall opening 17. Additional movement of connector 24 relative to the wall member 15 causes the tongue members 38 to depress inwardly permitting movement of the fastening apparatus connector 24 into the wall member opening 17 bringing stop surface 34 into abutting relationship with wall member 17. Tongue members 38, initially depressed by the movement of connector 24 through the wall opening 17, expand to fixedly secure the assembly to the wall 15 as shown in FIGURE 1.

To insure a weather tight joint between the fastening apparatus connector 24 and wall 15 adjacent opening 17, a sealing means 52 is preferably provided between the wall member 15 and connector stop surface 34. Sealing means 52 may comprise a ring-like element 53 located on tongue members 38 between the connector stop surface 34 and radially outwardly extending parts 40 of the tongue members. The sealing element 53 serves to tightly seal the area between the connector 24 and the wall member 15 upon the insertion of the connector 24 into the wall member opening 17.

It is appreciated that the end parts 41 of one or more tongue members 38 may be deformed as by outward bending or twisting subsequent to the insertion of the connector 24 into wall member opening 17 to more securely lock the fastening apparatus connector 24 to the wall member 15.

To detach tubular element 20 from wall member 15, connector 24 of the fastening apparatus 10 may be moved outwardly causing the tongue members 38 to depress. To facilitate detachment where the end part 41 of one or more of the tongue members 38 is deformed as by outward bending or twisting, the deformed tongue member parts may be bent or twisted into their original shape prior to moving the connector 24 relative to wall member 15. After removal of the tubular element-fastening apparatus assembly from the wall member opening 17, the fastening apparatus 10 may be removed from the tubular element 20 preferably by moving the connector 24 relative to the expander 26 to disengage the connector from the recess 48 and thereafter removing the expander 26 from the tubular element 20.

In the embodiment illustrated in FIGURE 4 of the drawings, wherein like numerals refer to like parts, a generally cylindrical expander or support 60 is provided having an outer diameter preferably slightly in excess of the inner diameter of the tubular element 20. Expander 60 may be formed from any suitable rigid material and is preferably formed from a suitable plastic material. Expander 60 is provided with an axial bore 62. One end of the expander 60 is preferably bevelled at 64 to facilitate insertion of the expander 60 into the tubular element 20, and to facilitate insertion of the expander-tubular element assembly into wall opening 70. Locking groove or recess 66 is provided in the outer surface of the expander 60 and is preferably located adjacent the bevelled surface 64. Recess 66 cooperates in a manner to be more particularly explained hereinafter with the portion of a wall 68 having opening 70 therein with a diameter preferably slightly greater or equal to the outer diameter of the tubular element 20 to securely attach the tubular element 20 to wall 68.

In use, expander 60 is inserted into the tubular element 20 to the position desired. Where the tubular element 20 encloses one or more electrical conductors (not shown), these conductors may pass through the bore 62 of the expander 60. Insertion of the expander 60 into the tubular element 20 radially stretches or expands the tubular element since the outer diameter of the expander 60 is preferably slightly greater than the inner diameter of the tubular element 20. The resilient or deformable characteristics of the tubular element 20 facilitate the stretching or expanding thereof by expander 60.

The tubular element 20 with the expander 60 positioned therein is thereafter moved through the opening 70 in the wall 68. The expanded tubular element portion is forcibly moved through opening 70 until the peripheral surface of the wall 68 defining the opening 70 engages the expander recess 66 to tightly fix the tubular element-expander assembly relative to the wall 68.

The expander or support designated 26 in FIGURES 1-3 and 60 in FIGURE 4, may have an outer diameter substantially equal to the inner diameter of tubular element 20. In this instance the outer diameter of the tubular element 20 is preferably slightly greater than the diameter of connector bore 30 (FIGURES 1-3) or the diameter of wall opening 70 (FIGURE 4). Referring to FIGURES 1-3, movement of the support 26-tubular element 20 assembly through the connector bore 30, as described heretofore, results in the peripheral surface of connector bore 30 resiliently deforming the portion of the tubular element opposite support recess 48 inwardly to tightly fix the fastening apparatus 10 relative to the tubular element 20.

Referring to the embodiment of FIGURE 4, movement of the support 60-tubular element 20 assembly through wall opening 70 as described heretofore causes the peripheral surface of the wall 68 defining opening 70 to resiliently deform the portion of the tubular element opposite support recess 66 inwardly to tightly fix the tubular element-support assembly relative to wall 68.

While I have described a preferred embodiment of my invention, it is to be understood that the invention is not limited thereto since it may be otherwise embodied within the scope of the following claim.

I claim:
Fastening apparatus for attaching a deformable tubular element to a wall having an opening therein through which said tubular element is adapted to pass, the combination of
(a) a cylindrical member having an outside dimension slightly greater than the inside dimension of said tubular element forceably insertable within said tubular element and cooperable therewith to form a subassembly, the outer surface of said member having an annular recess therearound, and
(b) a collar-like connector having a generally U section with one end projecting radially inwardly to define an opening having a dimension less than the outer dimension of said tubular element through which said subassembly may be forceably inserted to bring the portion of said connector one end defining said opening within said member recess with a part of said tubular element trapped therebetween, the opposite end of said collar-like connector having a plurality of circumferentially disposed resilient fingers projecting outwardly therefrom in a direction paralleling the axis of said connector, the dimension across said fingers being greater than the dimension of said wall opening, said fingers being compressible upon insertion of said connector within said wall opening to releasably secure said connector and said subassembly to said wall.

References Cited by the Examiner

UNITED STATES PATENTS

| | | | |
|---|---|---|---|
| 1,987,035 | 1/1935 | Tideman | 285—159 |
| 2,314,315 | 3/1943 | Scheele | 285—239 |
| 2,493,577 | 1/1950 | Franklin | 285—8 |
| 2,585,887 | 2/1952 | Woodward | 285—201 |
| 2,640,672 | 6/1953 | Bedford | 285—194 |
| 2,778,930 | 1/1957 | Harrington | 248—27 |

FOREIGN PATENTS 202,955  8/1958  Australia.

CARL W. TOMLIN, *Primary Examiner.*

S. R. MILLER, *Assistant Examiner.*